(12) United States Patent
Babb et al.

(10) Patent No.: US 10,571,040 B2
(45) Date of Patent: Feb. 25, 2020

(54) IRRIGATION VALVE WITH THREE-WAY SOLENOID ACTUATION TRAIN

(71) Applicant: Storm Manufacturing Group, Torrance, CA (US)

(72) Inventors: Brian Babb, Torrance, CA (US); Joseph Michael Holohan, Camarillo, CA (US); Hung Van Truong, Los Angeles, CA (US); Bogumil J. Matysek, Lomita, CA (US)

(73) Assignee: Storm Manufacturing Group, Torrance, CA (US)

( * ) Notice: Subject to any disclaimer, the term of this patent is extended or adjusted under 35 U.S.C. 154(b) by 196 days.

(21) Appl. No.: 15/648,693

(22) Filed: Jul. 13, 2017

(65) Prior Publication Data
US 2019/0017621 A1    Jan. 17, 2019

(51) Int. Cl.
*F16K 31/06* (2006.01)
*F16K 31/05* (2006.01)

(52) U.S. Cl.
CPC .......... *F16K 31/0658* (2013.01); *F16K 31/05* (2013.01)

(58) Field of Classification Search
USPC ............. 137/625.25, 487.5, 489.5; 251/168, 251/129.18, 20.01–30.03
See application file for complete search history.

(56) References Cited

U.S. PATENT DOCUMENTS

| 3,240,128 | A | * | 3/1966 | Wilson | F16K 31/402 251/331 |
| 4,226,259 | A | * | 10/1980 | Szekely | F16K 31/365 137/269 |
| 7,475,863 | B2 | * | 1/2009 | Donovan | F16K 31/402 251/285 |
| 2007/0164243 | A1 | * | 7/2007 | Volz | F16K 11/044 251/30.03 |

* cited by examiner

*Primary Examiner* — Jessica Cahill
*Assistant Examiner* — Daphne M Barry
(74) *Attorney, Agent, or Firm* — Felix L. Fischer (57) ABSTRACT

An irrigation valve incorporates a valve body with an inlet, an outlet, a pressure chamber and a standpipe in fluid communication with the inlet. A solenoid operated valve train has a flow control inlet fitting, a solenoid actuating element movable between in inactivated position and an activated position responsive to a solenoid coil, and a threaded manual actuator rotatably movable between a first sealing position and a second open position. The valve train is operable in a first position with the solenoid actuating element in the inactivated position to produce hydraulic interconnection between the standpipe and the pressure chamber, a second position with the solenoid actuating element in the activated position producing hydraulic interconnection between the pressure chamber and an outlet port, and a third position with the threaded manual actuator in the second open position producing hydraulic interconnection between the pressure camber and the outlet port.

17 Claims, 9 Drawing Sheets

IRRIGATION VALVE WITH THREE-WAY SOLENOID ACTUATION TRAIN

BACKGROUND INFORMATION

Field

Embodiments of the disclosure relate generally to the field of irrigation valves and more particularly to a no minimum flow requirement valve with a 3-way electric solenoid controlling the flow (on/off).

Background

Irrigation valves often employ solenoid actuation systems to allow automatic timed operation of an irrigation system. Prior art valves typically provide flow control through the valve for an "on" position providing water flow through the valve and an "off" position (no flow). Manual operation of the valve piston is typically provided using a single threaded operator connected to the valve piston and rotatable to force the piston into contact with the valve seat as a closed position or rotatable to an open position lifting the piston from the seat to allow flow. This arrangement is less that satisfactory in operation since mis-positioning of the threaded operator may impact the automatic operation of the valve.

It is therefore desirable to provide a means for manual operation to open the valve which does not require rotation of the threaded operator.

SUMMARY

Embodiments disclosed herein provide an irrigation valve which incorporates a valve body with an inlet, an outlet, a pressure chamber plate and a standpipe in fluid communication with the inlet. A solenoid operated valve train has a flow control inlet fitting, a solenoid actuating element movable between an inactivated position and an activated position responsive to a solenoid coil, and a threaded manual actuator rotatably movable between a first sealing position and a second open position. The valve train is operable in a first position with the solenoid actuating element in the inactivated position to produce hydraulic interconnection between the standpipe and the pressure chamber. The valve train is operable in a second position with the solenoid actuating element in the activated position producing hydraulic interconnection between the pressure chamber and an outlet port. The valve train operable in a third position with the threaded manual actuator in the second open position producing hydraulic interconnection between the pressure camber and the outlet port.

The features, functions, and advantages that have been discussed can be achieved independently in various embodiments of the present disclosure or may be combined in yet other embodiments further details of which can be seen with reference to the following description and drawings.

DETAILED DESCRIPTION

Embodiments disclosed herein provide a no minimum flow requirement irrigation valve having a solenoid operated valve train with three positions for closed, open and manual operation. In a normally closed position, a hydraulic connection is made through a first port between a water inlet to the valve and a bonnet pressure chamber thereby hydraulically engaging a pressure plate and urging a valve piston into engagement with a valve seat. The activation of a solenoid actuating element closes the first port and opens a flow channel interconnecting the bonnet pressure chamber with an outlet orifice to depressurize working fluid in the chamber. A threaded rotatable manual sealing plug is operable to manually displace the solenoid actuating element to close the first port and simultaneously open a vent port in communication with the outlet orifice thereby depressurizing working fluid in the chamber.

Figure 1:
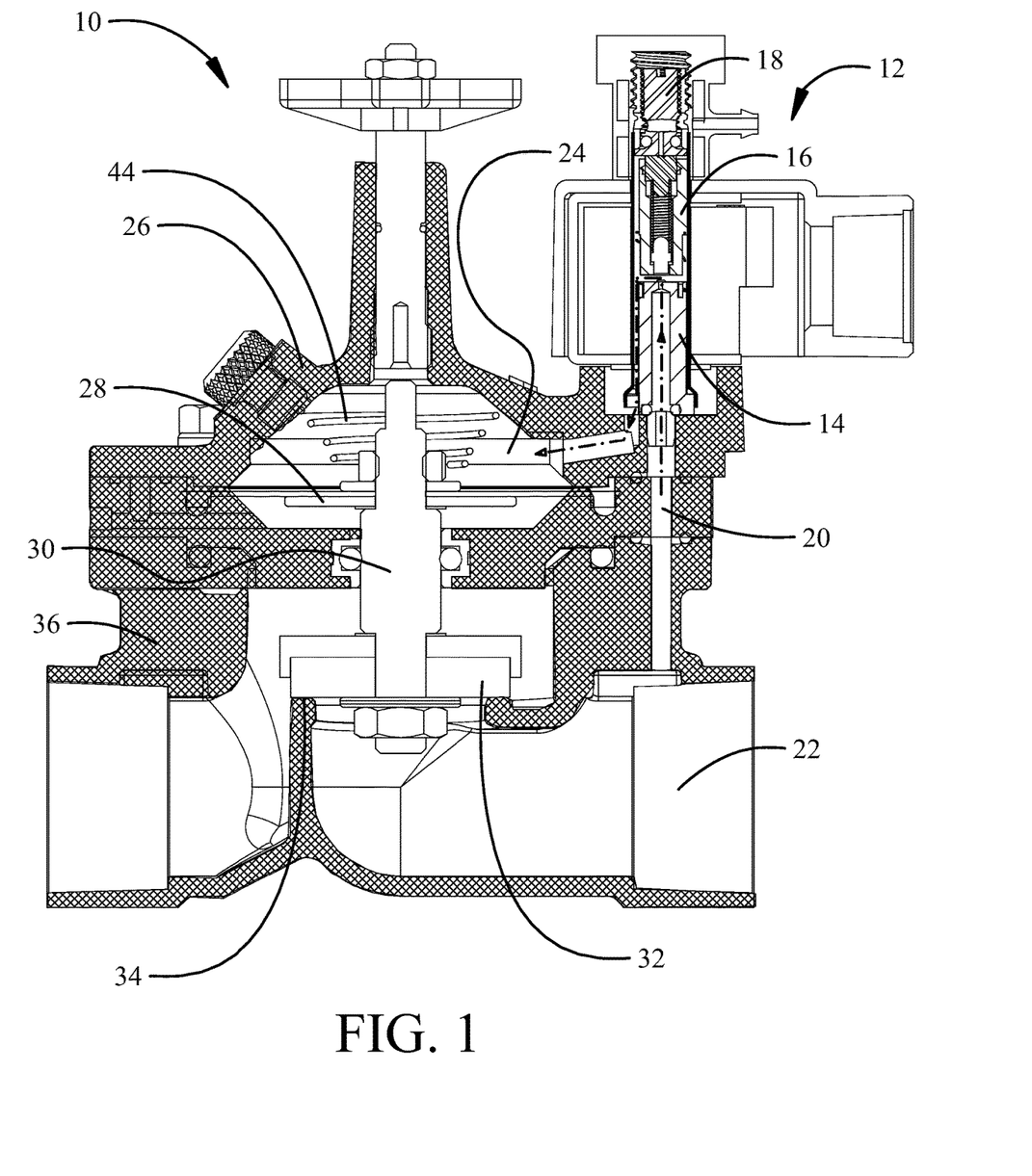
FIG. 1 is section view of an exemplary embodiment of a no minimum flow requirement irrigation valve with a three way solenoid actuation train with the valve in a "closed" position.

Referring to the drawings, FIG. 1 shows an exemplary embodiment of an irrigation valve 10 having a solenoid operated valve train 12. The valve train 12 incorporates a flow control inlet fitting 14 which may include a particulate filter, a solenoid actuating element 16, and a multipart threaded manual actuator 18, all to be described in greater detail subsequently.

With the valve 10 in a "closed" position the solenoid operated valve train 12 allows hydraulic communication between an inlet standpipe 20, which is connected to the water source inlet 22, and a pressure chamber 24 in a bonnet 26 of the valve. Hydraulic pressure provided to the pressure chamber 24, with the valve in this configuration, operates on a pressure plate 28 connected through a shaft 30 to urge a sealing piston 32 into contact with a valve seat 34 in a body 36 of the valve. With the sealing piston 32 engaging the valve seat 34, water flow from the inlet 22 is blocked.

Figure 2:
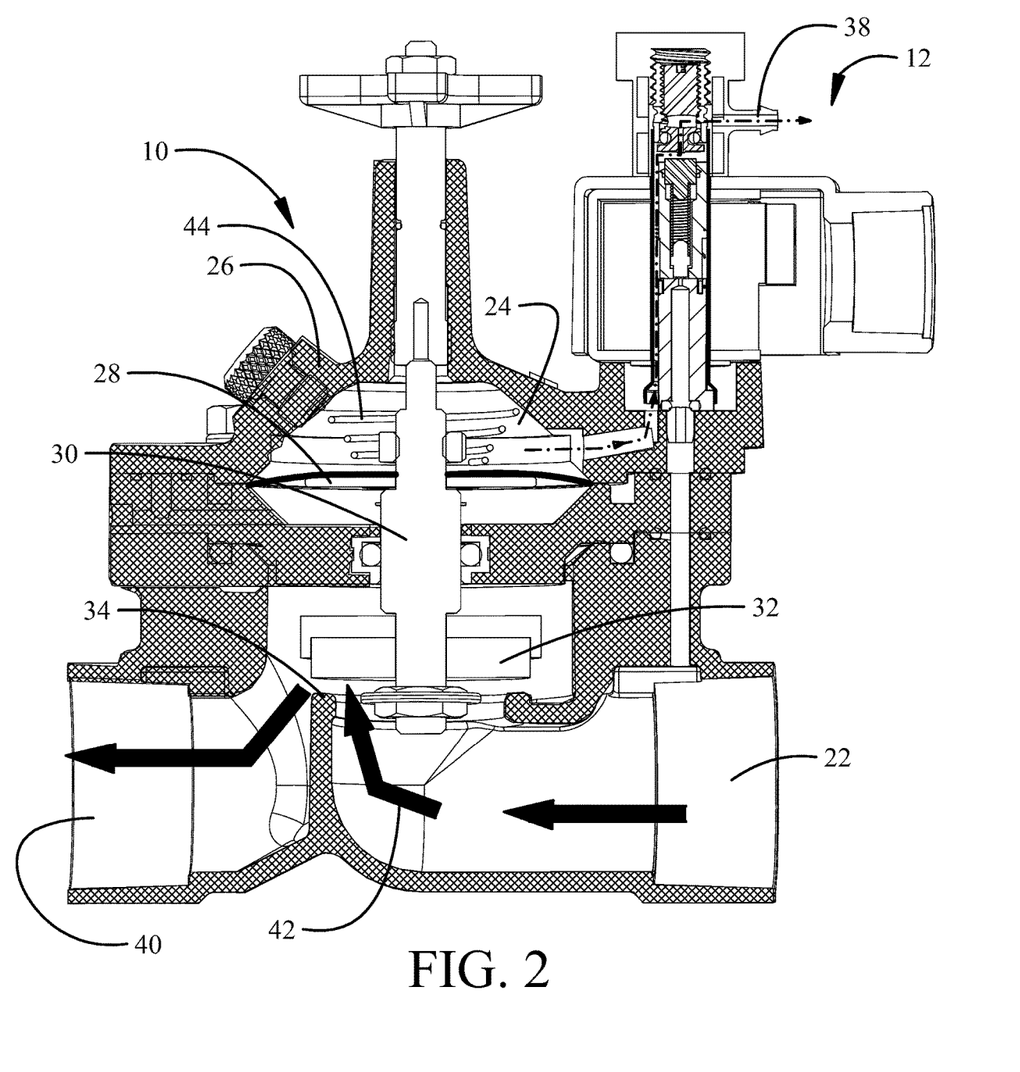
FIG. 2 is a section view of the embodiment of FIG. 1 with the valve an "open" position.

FIG. 2 shows the valve 10 in an "open" position. Valve train 12 is engaged to interrupt hydraulic communication from the inlet standpipe 20 and hydraulic pressure in the pressure chamber 24 is simultaneously relieved through channels in the valve train 12 to a relief port 38, as will be described in greater detail subsequently. Relief of hydraulic pressure in the pressure chamber 24 allows pressure plate 28 to withdraw into the chamber with shaft 30 disengaging the sealing piston 32 from the valve seat 34 allowing flow of water from the inlet 22 through the valve seat and an outlet 40 as indicated by arrows 42. A balancing spring 44 is engaged between the pressure plate 28 and the bonnet 26.

Figure 3:
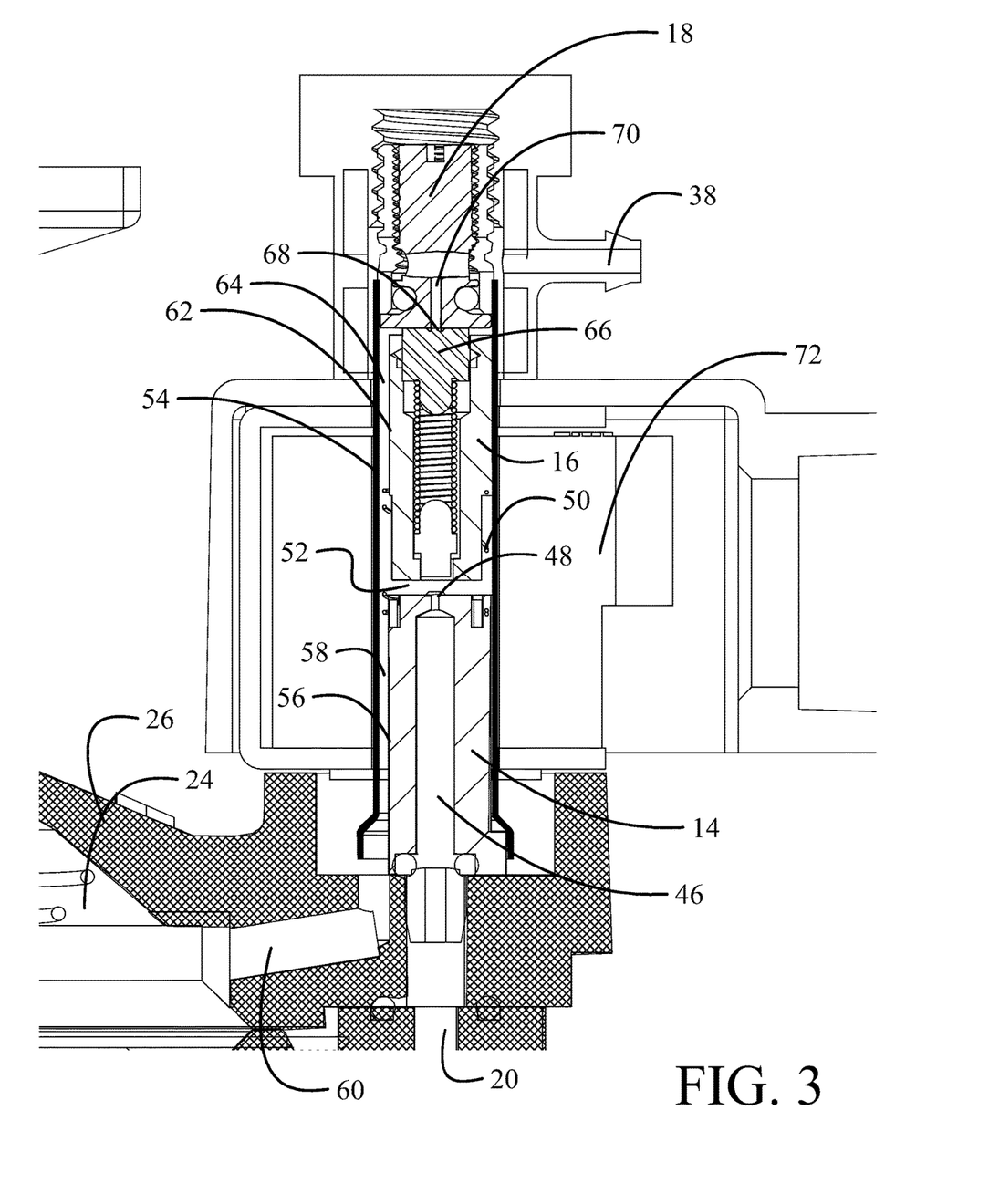
FIG. 3 is a detailed section view of the solenoid actuation train in the "closed" position providing hydraulic connection to the water source for pressurized sealing of the valve piston.
Figure 4:
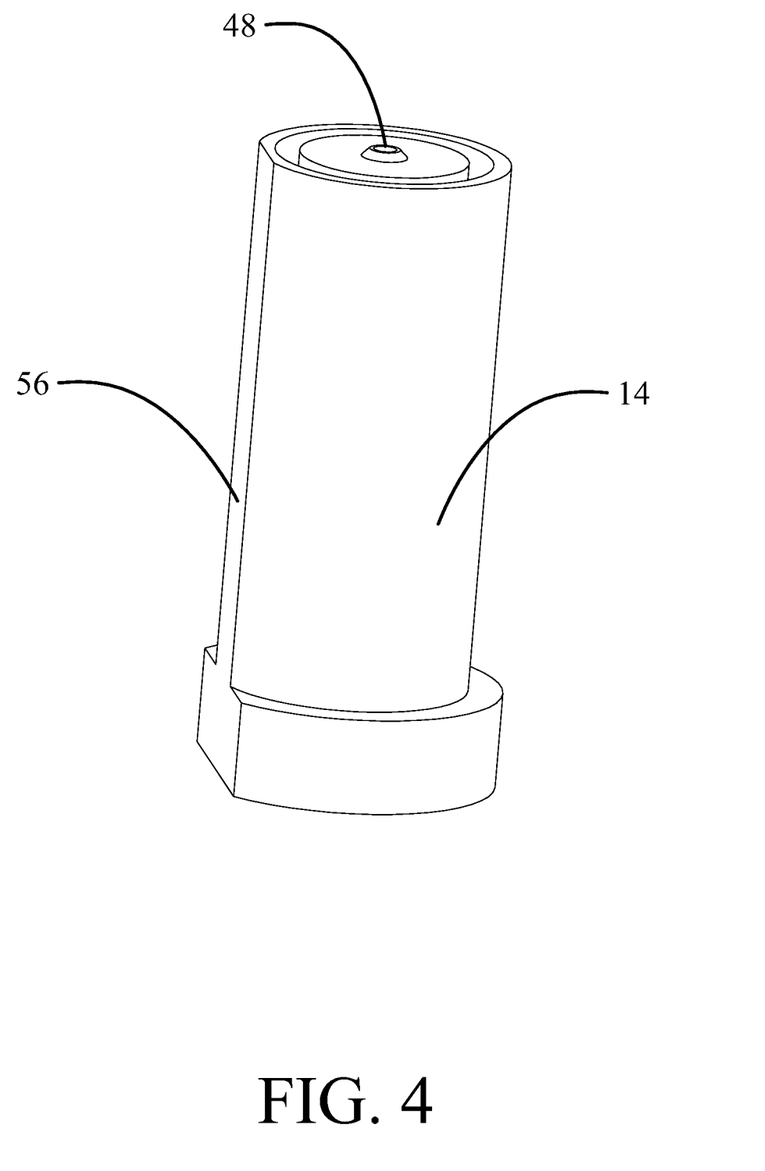
FIG. 4 is a detailed pictorial view of the control flow entry fitting.

FIG. 3 demonstrates the detailed components of the valve train 12 and flow paths of the valve in the closed position. The flow control fitting 14 incorporates an inlet conduit 46 interconnected to the inlet standpipe 20. The inlet conduit terminates at an inlet orifice 48. The solenoid actuating element 16 is urged away from the flow control fitting by a spring 50 and, when not activated by the solenoid coil 72, a first pressure channel 52 between the flow control fitting 14 and the solenoid actuating element 16 is open. The flow control fitting 14 and solenoid actuating element 16 are received in a sleeve 54. The flow control fitting 14 has a flat 56 (as best seen in FIG. 4), which allows a first communication conduit 58 between the flow control fitting 14 and the sleeve 54. The first communication conduit 58 is in flow communication with the first pressure channel 52 and a second communication conduit 60 leading into the pressure chamber 24 in the bonnet 26. Water present in the standpipe 20 with associated hydraulic pressure from the inlet 22 is flows through inlet conduit 46, orifice 48, first pressure channel 52, first communication conduit 58 and second communication conduit 60 into the pressure chamber 24 thereby maintaining hydraulic pressure on the pressure plate 28 to close the valve as previously described. While shown as a flat in the cylindrical shape of the flow control fitting, the first communication conduit may be formed with a slot, channel or other geometrical arrangement in the control fitting or the sleeve in alternative embodiments.

Figure 5:
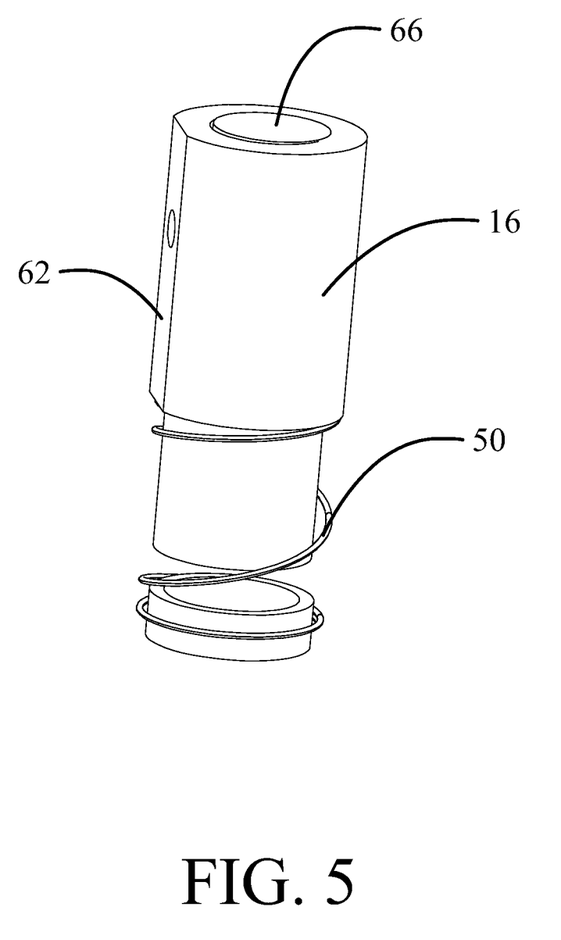
FIG. 5 is a detailed pictorial view of the solenoid actuating element.

The solenoid actuating element 16 also has a flat 62 (best seen in FIG. 5) which forms a third communication conduit 64 between the solenoid actuating element and the sleeve 54. While shown as a flat in the cylindrical shape of the solenoid actuating element, the first communication conduit may be formed with a slot, channel or other geometrical arrangement in the solenoid actuating element or the sleeve in alternative embodiments.

A first seal plug 66 in an upper end of the solenoid actuating element engages and seals an outlet orifice 68 in a manual actuator 18. Outlet orifice 68 opens to an outlet conduit 70 through the manual actuator which is in flow communication with the outlet port 38.

Figure 6:
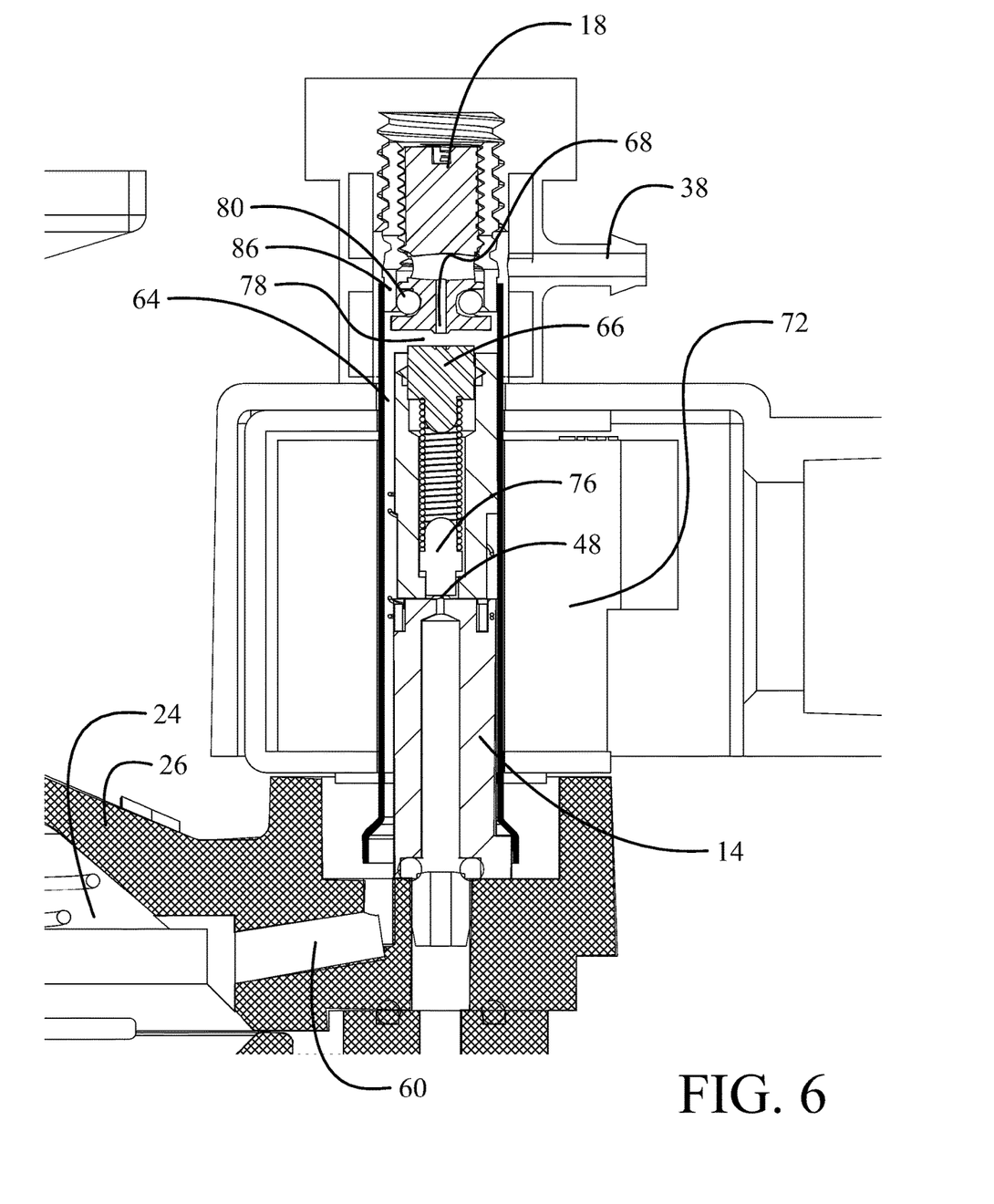
FIG. 6 is a detailed section view of the solenoid actuation train in the "open" position venting the hydraulic connection to allow opening of the valve piston for water flow through the valve.

When activated by solenoid coil 72 to place the valve 10 in the open position as described with respect to FIG. 2, the valve train 12 assumes the position shown in detail in FIG. 6. Solenoid actuating element 16 is drawn downward against spring 50 to translate from an inactivated position to an activated position and engages the inlet orifice 48 with a second seal plug 76 closing first pressure channel 52. The first seal plug 66 is drawn downward opening the outlet orifice 68 to a second pressure channel 78 which communicates with third communication conduit 64 between the solenoid actuating element and sleeve. This provides relief of hydraulic pressure in the pressure chamber 24 through second communication conduit 50, third communication conduit 64 and second pressure channel 74 through the outlet orifice 68 and outlet conduit 70 to the outlet port 38. As previously described this allows flow from the pressure chamber with the pressure plate 28 withdrawing into the chamber and shaft 30 disengaging the sealing piston 32 from the valve seat 34.

Figure 7:
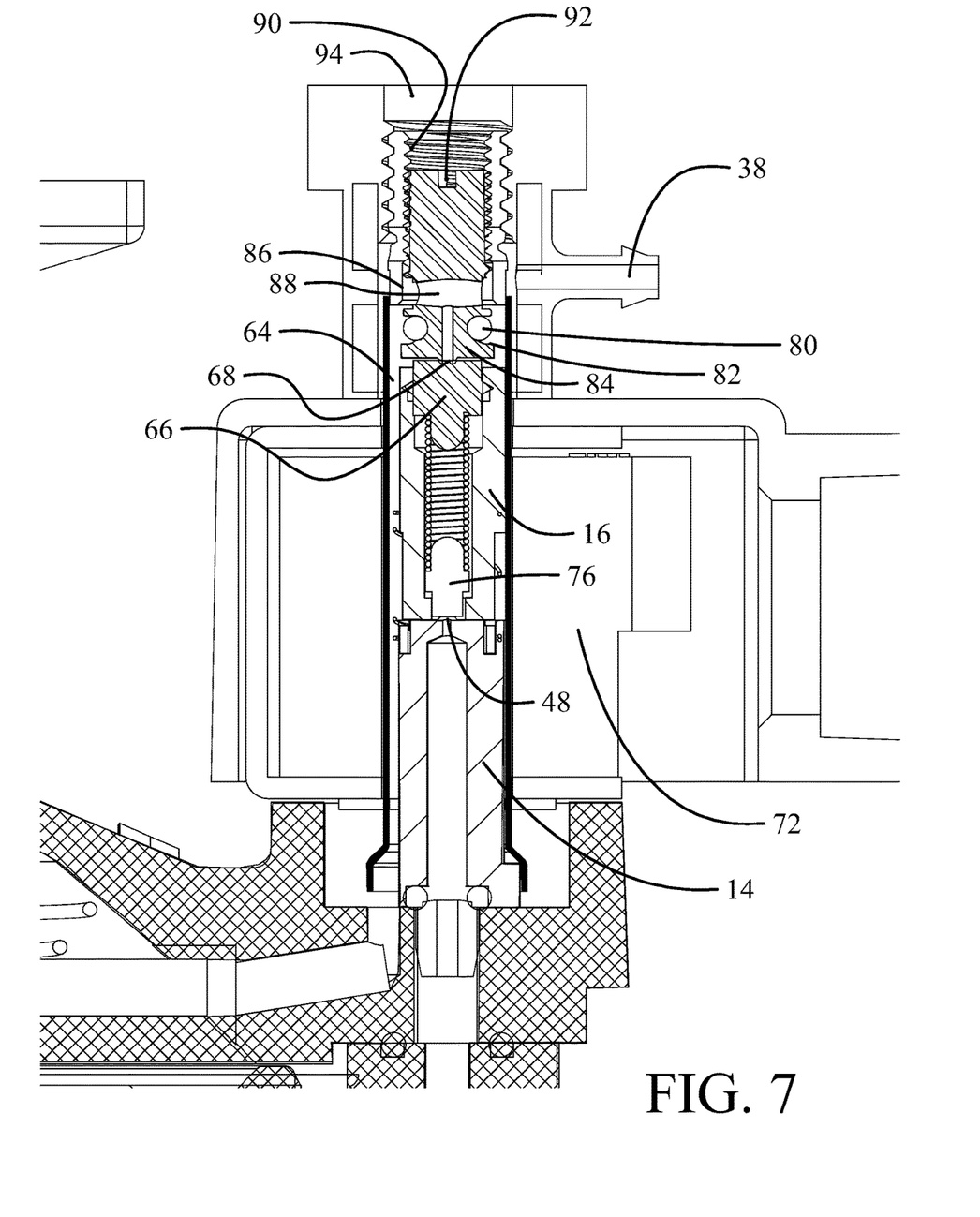
FIG. 7 is a detailed section view of the solenoid actuation train in the manually activated "open" position venting the hydraulic connection to allow opening of the valve piston for water flow through the valve.
Figure 8:
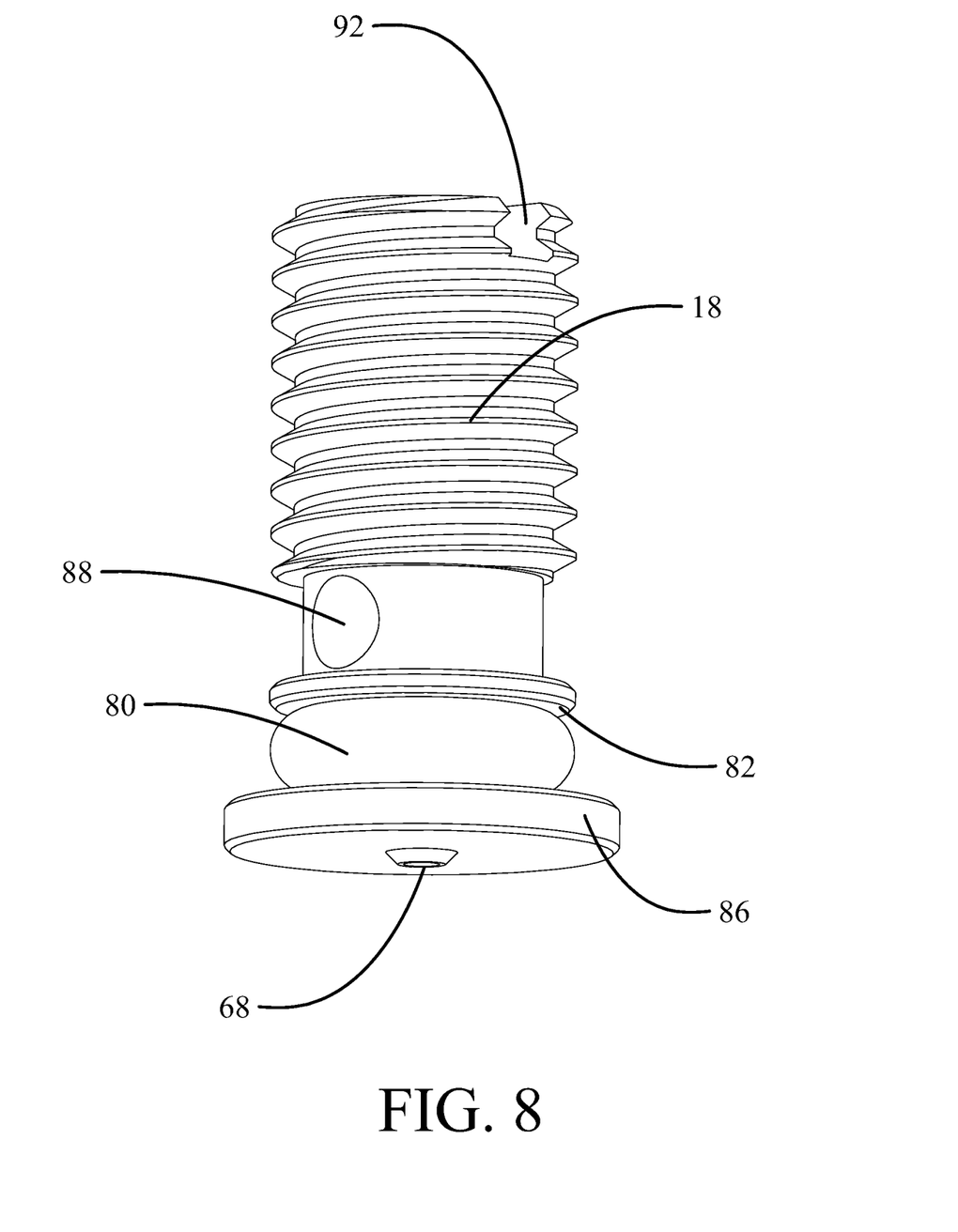
FIG. 8 is a detailed pictorial view of the rotatable manual sealing plug.

The embodiment as shown provides a third control position using threaded manual actuator 18 as shown in FIG. 7 with the actuator shown in detail in FIG. 8. As seen in FIGS. 3 and 6 with the threaded manual actuator 18 in a withdrawn position, o-ring 80, which is received in a groove 82 adjacent a lower flange 84, seals against a circumferential surface 86. As seen in FIG. 7, the valve 10 may be manually opened by screwing in the threaded manual actuator 18 which disengages the o-ring from the circumferential surface 86 opening flow communication between third communication channel 64 and a cross channel 88 in the threaded manual actuator connecting to outlet conduit 70 and outlet port 38. The threaded manual actuator additionally contacts the solenoid actuating element 16 urging the solenoid actuating element downward to close inlet port 48 with first pressure plug 76 and closing first pressure channel 52 regardless of whether the solenoid coil 72 is activated. The threaded manual actuator pressing against the solenoid actuating element additionally seals outlet orifice 68 against second pressure plug 66. As shown, threaded manual actuator 18 is received in a threaded bore 90 and incorporates a screw driver slot 92, or similar engagement element, which is accessed through aperture 94 in a cap 96 on the drive train 12.

Figure 9:
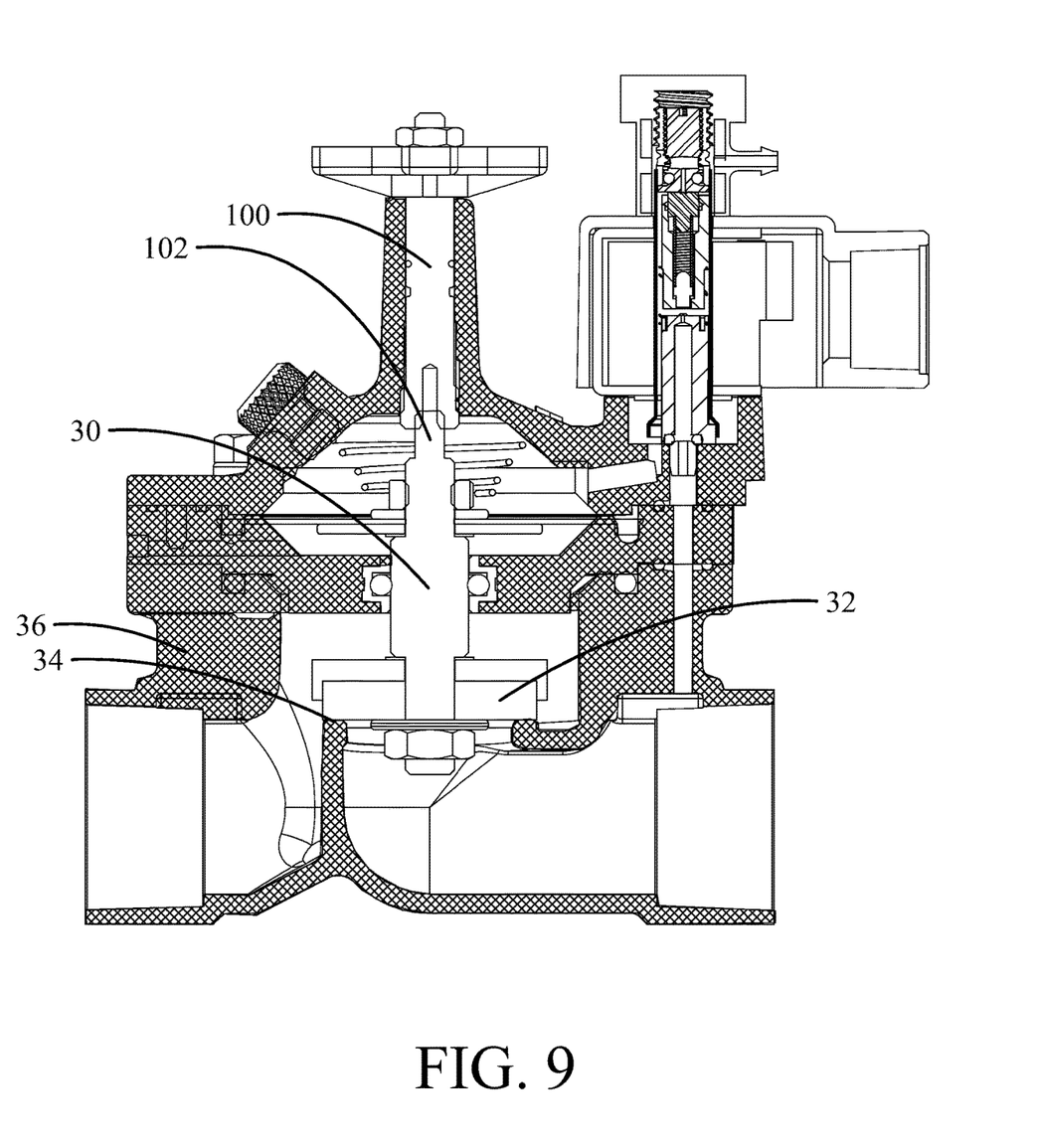
FIG. 9 is a section view with the threaded operator forcing a closed position of the by engagement of the piston with the valve seat.

As seen in FIGS. 1, 2 and 9, manual operation to close the valve 10 is also provided through a threaded operator 100 received through the bonnet 26 to engage an upper extension 102 of the shaft 30. As seen in FIG. 9, by manually screwing in the threaded operator 100, shaft 30 is forced downward urging sealing piston 32 into contact with the valve seat 34 in the body 36 of the valve thereby blocking water flow from the inlet 22 to the outlet 40. The threaded operator 100 is a master control which places the valve in a closed position regardless of activation of the solenoid coil 72 operating solenoid actuating element 16 or threaded manual actuator 18.

Having now described various embodiments of the disclosure in detail as required by the patent statutes, those skilled in the art will recognize modifications and substitutions to the specific embodiments disclosed herein. Such modifications are within the scope and intent of the present disclosure as defined in the following claims.

What is claimed is:

1. An irrigation valve comprising:
a valve body with an inlet, an outlet, a pressure chamber and a standpipe in fluid communication with the inlet;
a solenoid operated valve train having
a solenoid actuating element translatable between an inactivated position and an activated position responsive to a solenoid coil;
a flow control inlet fitting, said flow control inlet fitting and the solenoid actuating element received within a sleeve, said solenoid actuating element translatable in the sleeve between the inactivated position and the activated position, said flow control inlet fitting further having an inlet conduit connected to the standpipe and terminating in an inlet orifice, said inlet orifice in communication with a first pressure channel with the solenoid actuating element in the inactivated position, said first pressure channel in fluid communication with a first communication conduit, said first communication conduit in fluid communication with a second communication conduit connected to the pressure chamber and said flow control fitting incorporating a flat forming the first communication conduit intermediate the flow control fitting and the sleeve;
and
a threaded manual actuator rotatably movable between a first sealing position and a second open position;
said valve train operable in a first position with the solenoid actuating element in the inactivated position producing hydraulic interconnection between the standpipe and the pressure chamber, said valve train operable in a second position with the solenoid actuating element in the activated position producing hydraulic interconnection between the pressure chamber and an outlet port, and, said valve train operable in a third position with the threaded manual actuator in the second open position producing hydraulic interconnection between the pressure camber and the outlet port.

2. The irrigation valve as defined in claim 1 wherein the threaded manual actuator comprises:
a cylindrical element having a groove adjacent a lower flange,
an o-ring engaged within the groove, said o-ring sealing against a circumferential surface with the threaded manual actuator in the first sealing position.

3. The irrigation valve as defined in claim 1 further comprising:
a pressure plate carried within the pressure chamber, said pressure plate moveable from a first position to a second position responsive to hydraulic pressure in the pressure chamber, said first position induced with the valve train in the first position and said second position induced with the valve train in the second or third position;
a shaft interconnecting the pressure plate to a sealing piston;
wherein said pressure plate in the first position urges the sealing piston into contact with a valve seat in the valve body.

4. The irrigation valve as defined in claim 3 further comprising a threaded operator received through a bonnet enclosing the pressure chamber, said threaded operator rotatable between a first position and a second position to engage an upper extension of the shaft, the threaded operator in the second position forcing shaft to urge sealing piston into contact with the valve seat.

5. The irrigation valve as defined in claim 1 wherein the solenoid actuating element has a first seal plug engaging and sealing an outlet orifice in the threaded manual actuator in the inactivated position and a second seal plug engaging and sealing the inlet orifice on the flow control fitting in the activated position, and wherein the solenoid actuating element in the activated position opens a second pressure channel, said second pressure channel in communication with
a third communication conduit in fluid communication with the second communication conduit, and
the outlet orifice, said outlet orifice connected to an outlet conduit in communication with the outlet port.

6. The irrigation valve as defined in claim 5 wherein the threaded manual actuator in the second open position disengages the o-ring from the circumferential surface opening flow communication between the third communication channel and the cross channel in the threaded manual actuator, said cross channel connecting to the outlet conduit.

7. The irrigation valve as defined in claim 6 wherein the threaded manual actuator in the second open position additionally contacts the solenoid actuating element urging the solenoid actuating element to close inlet port with first pressure plug and closing the first pressure channel.

8. The irrigation valve as defined in claim 7 wherein the threaded manual actuator in the second open position additionally seals outlet orifice against second pressure plug.

9. The irrigation valve as defined in claim 8 wherein the threaded manual actuator is received in a threaded bore and incorporates an engagement element, said engagement element is accessed through an aperture in a cap on the valve train.

10. An irrigation valve comprising:
a valve body with an inlet, an outlet, a pressure chamber and a standpipe in fluid communication with the inlet;
a threaded manual actuator rotatably movable between a first scaling position and a second open position;
a solenoid operated valve train having
a solenoid actuating element translatable between in inactivated position and an activated position responsive to a solenoid coil, the solenoid actuating element having a first seal plug engaging and sealing an outlet orifice in the threaded manual actuator in the inactivated position and a second seal plus engaging and sealing the inlet orifice on the flow control fitting in the activated position, and wherein the solenoid actuating element in the activated position opens a second pressure channel, said second pressure channel in communication with
a third communication conduit in fluid communication with a second communication conduit, and
the outlet orifice, said outlet orifice connected to an outlet conduit in communication with an outlet port;
a flow control inlet fitting having an inlet conduit connected to the standpipe and terminating in an inlet orifice, said inlet orifice in communication with a first pressure channel with the solenoid actuating element in the inactivated position, said first pressure channel in fluid communication with the first communication conduit, said first communication conduit in fluid communication with the second communication conduit connected to the pressure chamber; and
said valve train operable in a first position with the solenoid actuating element in the inactivated position producing hydraulic interconnection between the standpipe and the pressure chamber,
said valve train operable in a second position with the solenoid actuating element in the activated position producing hydraulic interconnection between the pressure chamber and the outlet port,
said valve train operable in a third position with the threaded manual actuator in the second open position producing hydraulic interconnection between the pressure chamber and the outlet port; and
wherein the flow control inlet fitting and the solenoid actuating element are received within a sleeve, said solenoid actuating element translatable in the sleeve between the inactivated position and the activated position and the solenoid actuating element incorporates a flat forming the third communication conduit intermediate the solenoid actuating element and the sleeve.

11. The irrigation valve as defined in claim 10 wherein the threaded manual actuator comprises:
a cylindrical element having a groove adjacent a lower flange,
an o-ring engaged within the groove, said o-ring sealing against a circumferential surface with the threaded manual actuator in the first sealing position.

12. The irrigation valve as defined in claim 10 wherein the threaded manual actuator in the second open position disengages the o-ring from the circumferential surface opening flow communication between the third communication channel and a cross channel in the threaded manual actuator, said cross channel connecting to the outlet conduit.

13. The irrigation valve as defined in claim 12 wherein the threaded manual actuator in the second open position additionally contacts the solenoid actuating element urging the solenoid actuating element to close inlet port with first pressure plug and closing the first pressure channel.

14. The irrigation valve as defined in claim 13 wherein the threaded manual actuator in the second open position additionally seals the outlet orifice against second pressure plug.

15. The irrigation valve as defined in claim 14 wherein the threaded manual actuator is received in a threaded bore and incorporates an engagement element, said engagement element is accessed through an aperture in a cap on the valve train.

16. The irrigation valve as defined in claim 10 further comprising:
    a pressure plate carried within the pressure chamber, said pressure plate moveable from a first position to a second position responsive to hydraulic pressure in the pressure chamber, said first position induced with the valve train in the first position and said second position induced with the valve train in the second or third position;
    a shaft interconnecting the pressure plate to a sealing piston;
    wherein said pressure plate in the first position urges the sealing piston into contact with a valve seat in the valve body.

17. The irrigation valve as defined in claim 16 further comprising a threaded operator received through a bonnet enclosing the pressure chamber, said threaded operator rotatable between a first position and a second position to engage an upper extension of the shaft, the threaded operator in the second position forcing shaft to urge sealing piston into contact with the valve seat.

* * * * *